(12) United States Patent
Sasaki et al.

(10) Patent No.: US 8,437,946 B2
(45) Date of Patent: May 7, 2013

(54) INTAKE SYSTEM CONTROL DEVICE AND METHOD

(75) Inventors: Jun Sasaki, Yokohama (JP); Keiji Shimotani, Yokohama (JP)

(73) Assignee: Transtron Inc., Yokohama-Shi (JP)

( * ) Notice: Subject to any disclaimer, the term of this patent is extended or adjusted under 35 U.S.C. 154(b) by 424 days.

(21) Appl. No.: 12/805,369

(22) Filed: Jul. 27, 2010

(65) Prior Publication Data

US 2011/0029220 A1  Feb. 3, 2011

(30) Foreign Application Priority Data

Jul. 31, 2009  (JP) ................... 2009-178714

(51) Int. Cl.
  *G06G 7/70* (2006.01)
  *G06G 7/12* (2006.01)

(52) U.S. Cl.
  USPC ............................ 701/106; 701/108; 701/114

(58) Field of Classification Search .................. 701/106, 701/101, 102, 103, 108, 114, 115; 123/308, 123/432, 480, 559.1, 559.2, 568.11, 568.21, 123/704, 184.56; 60/605.1, 605.2, 598, 599, 60/602
See application file for complete search history.

(56) References Cited

U.S. PATENT DOCUMENTS

| 6,148,616 | A | 11/2000 | Yoshida et al. |
| 6,305,167 | B1 | 10/2001 | Weisman, II et al. |
| 6,422,219 | B1 * | 7/2002 | Savonen et al. .......... 123/568.12 |
| 6,601,387 | B2 * | 8/2003 | Zurawski et al. ............ 60/605.2 |
| 7,117,078 | B1 * | 10/2006 | Gangopadhyay ............. 701/103 |

FOREIGN PATENT DOCUMENTS

| EP | 0992663 | 4/2000 |
| JP | 10-115259 | 5/1998 |
| JP | 2000-002122 | 1/2000 |
| JP | 2000-110574 | 4/2000 |
| JP | 2008-248859 | 10/2008 |

OTHER PUBLICATIONS

Notice of Rejection, dated Feb. 26, 2013, in corresponding Japanese Application No. 2009-178714 (3 pp.).

* cited by examiner

*Primary Examiner* — Mahmoud Gimie
(74) *Attorney, Agent, or Firm* — Staas & Halsey LLP

(57) ABSTRACT an intake system control device includes: an acquisition section that acquires an operation condition of an engine; a steady-state value determination section that determines input and output steady-state values for an intake system of the engine based on the acquired operation condition; a gain determination section that determines a gain for a state space model; and a first input calculation section that calculates the intake system input from the acquired operation condition, the input steady-state value, the output steady-state value, and an intake system output by using the state space model having the determined gain.

16 Claims, 11 Drawing Sheets

INTAKE SYSTEM CONTROL DEVICE AND METHOD

CROSS-REFERENCE TO RELATED APPLICATIONS

This application is based upon and claims the benefit of priority of the prior Japanese Patent Application No. 2009-178714, filed on Jul. 31, 2009, the entire contents of which are incorporated herein by reference.

FIELD

The embodiment discussed herein is related to an intake system control device and an intake system control method that control an intake system of an engine.

BACKGROUND

Combustion in a diesel engine is lean combustion in which the ratio of oxygen to fuel is high, which causes an increase in the amount of NOx (nitrogen compound) in exhaust gas emission. However, recent diesel engines achieve satisfactory emission performance in a steady region.

As a technique relating to the invention, there is known a technique for enhancing followability of air-fuel ratio control and reducing exhaust gas emission.
[Patent Document 1] Japanese Laid-open Patent Publication No. 2000-110574

However, it is important to improve engine performance not only in a steady region but in a transition region where acceleration or the like is performed.

The invention has been made to solve the above problem, and an object thereof is to provide an intake system control device and an intake system control method capable of improving engine performance in a transition region.

SUMMARY

According to an aspect of the invention, an intake system control device includes: an acquisition section that acquires an operation condition of an engine; a steady-state value determination section that determines an input and output steady-state values for an intake system of the engine based on the acquired operation condition, the intake system being a system that includes an exhaust gas recirculation section, a variable nozzle turbocharger, a fresh air flow sensor, and an intake pressure sensor, receives as an input an intake system input including a valve opening degree in the exhaust gas recirculation section and a variable vane opening degree in the variable nozzle turbocharger, and outputs an intake system output including a fresh air flow rate measured by the fresh air flow sensor and an intake pressure measured by the intake pressure sensor, the input steady-state value being the intake system input obtained under the acquired operation condition and in the steady state, the output steady-state value being the intake system output obtained under the acquired operation condition and in the steady state; a gain determination section that determines a gain for a state space model, the state space model being a model that is used for control of the intake system, receives as a model input a variation of the valve opening degree and a variation of the variable vane opening degree, and outputs as a model output a variation of the fresh air flow rate and a variation of the intake pressure, the gain determination section determining the determined gain from the acquired operation condition and the valve opening degree based on a first relationship among the operation condition, valve opening degree, and a gain in the state space model; and a first input calculation section that calculates the intake system input from the acquired operation condition, the input steady-state value, the output steady-state value, and the intake system output by using the state space model having the determined gain.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENT

An embodiment of the invention will be described below with reference to the accompanying drawings.

In the following, an intake system 10 of a diesel engine 1, which is an example of a control target of an intake system control device according to the invention, will be described.

Figure 1:
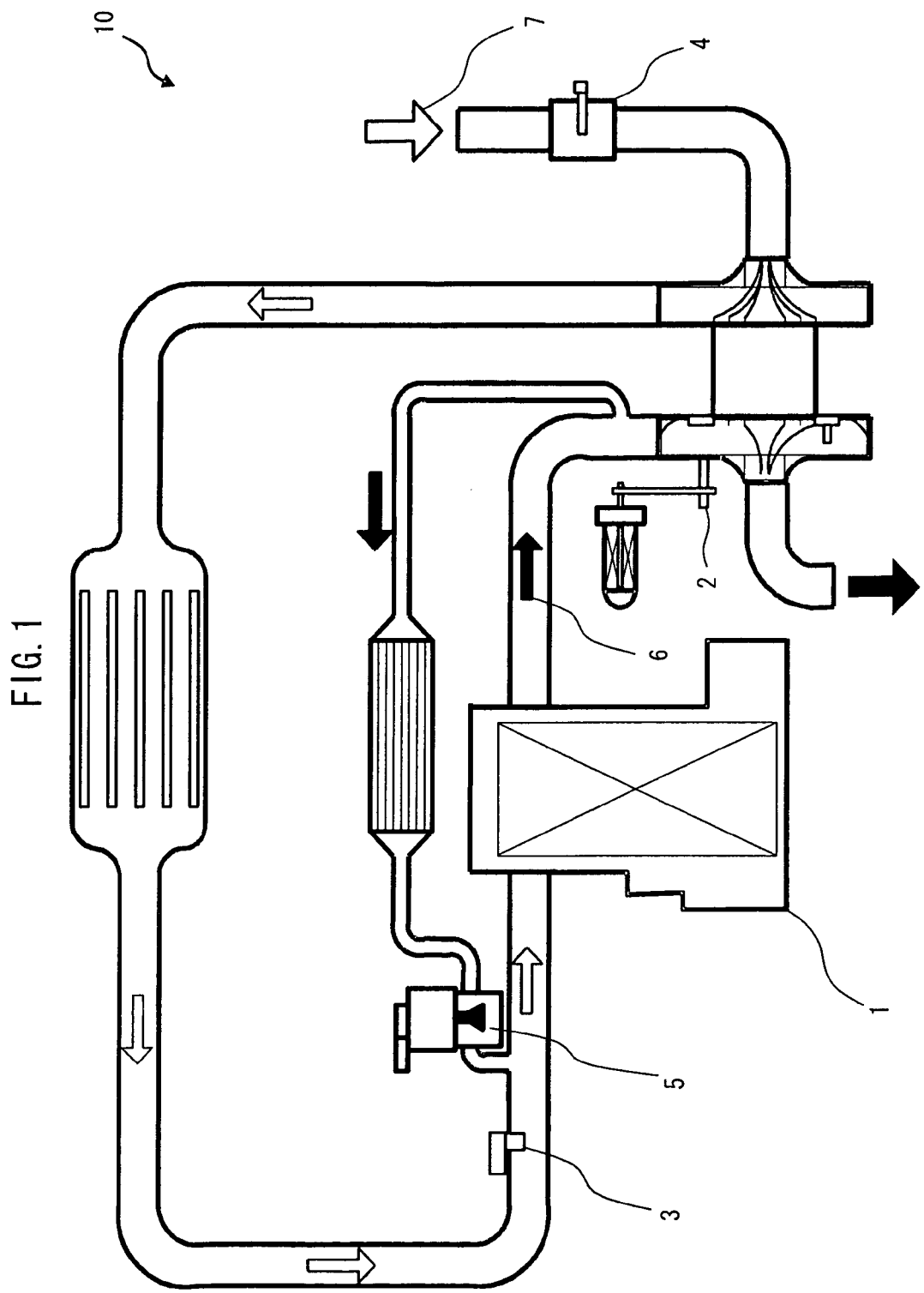
FIG. 1 is a view schematically illustrating a configuration of an intake system of a diesel engine.

FIG. 1 is a view schematically illustrating a configuration of the intake system 10 of the diesel engine 1. The intake system 10 includes a VNT (Variable Nozzle Turbocharger (also referred to as VGT: Variable Geometry Turbocharger)) section 2, an EGR (Exhaust Gas Recirculation) section 5, an intake pressure sensor 3, and a fresh air flow sensor 4. In FIG. 1, fresh air 7 is denoted by a white arrow, and exhaust gas 6 is denoted by a black arrow.

In order to suppress the amount of oxygen in the cylinder gas of the diesel engine 1, the intake system 10 opens a valve of the EGR section 5 to perform recirculation of the exhaust gas 6. Further, in order to improve the output property of the diesel engine 1, exhaust pressure is used to rotate a variable vane of the VNT section 2 to thereby increase intake pressure of the fresh air 7.

Management of the amount of oxygen in the intake air is important for reduction of exhaust gas emission. The amount of the fresh air 7 (MAF: Mass Air Flow) and intake pressure (MAP: Manifold Absolute Sensor) are used to acquire the amount of oxygen in the intake air. The MAF is measured by the fresh air flow sensor 4 attached near the entrance of an intake pipe. The MAP is measured by the intake pressure sensor 3 provided in the intake pipe.

An intake system control device 11 is an example in which the intake system control device of the invention is applied to control of the intake system of the diesel engine 1.

The intake system control device 11 controls an intake system 10. More specifically, the intake system control device 11 controls the valve opening degree (EGR opening degree) which is the opening degree of an EGR value in the EGR section 5 and variable vane opening degree (VNT opening degree) which is the opening degree of the variable vane in the VNT section 2 based on the MAF measured by the fresh air flow sensor 4 and MAP measured by the intake pressure sensor 3. Hereinafter, a parameter representing the valve opening degree is defined as EGR, a parameter representing the variable vane opening degree is as VNT, a parameter representing the MAF is as MAF, and a parameter representing the MAP is as MAP.

An intake system control device according to a first comparative example will be described.

An intake system control device of the first comparative example is an intake system control device in which control of EGR for MAF and control of VNT for MAP are made by PID control (proportional-integral-derivative control) method independently of each other, and mutual interference between both the control operations is not taken into consideration. The first comparative example is a control system in which a considerable amount of man-hours are required for adjustment. Further, the first comparative example strongly influenced by the mutual interference in a transition region (sudden acceleration time, etc.), thus posing a problem in target value followability particularly in the transition region.

Figure 2:
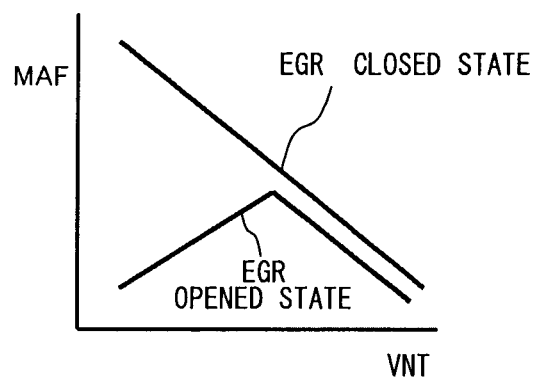
FIG. 2 is a view illustrating EGR dependency of the relationship between VNT and MAF.

That an increment in MAF (slope of MAF relative to VNT, which is hereinafter referred to as VNT-MAF gain) relative to an increment in VNT depends on EGR can be taken as a cause of the problem in the first comparative example. FIG. 2 illustrates EGR dependency of the relationship between VNT and MAF. As illustrated, the sign of VNT-MAF gain differs between a state (EGR closed state) where the EGR valve is closed (e.g., at acceleration time) and EGR is smaller than a predetermined EGR threshold and a state (EGR opened state) where the EGR valve is opened and EGR is equal to or larger than the predetermined EGR threshold. This phenomenon becomes a problem particularly in the case where a MIMO (multi-in multi-out) control system is constructed at the transition operation time at which the EGR valve is opened and closed at short times.

In the intake system control device of the first comparative example, the EGR control and VNT control are each an independent one-input one-output control system. In the case where EGR is small, a serious problem does not occur in the EGR control and VNT control in the intake system control device of the first comparative example. However, when a case where EGR is large occurs with increasing frequency with recent tighter control on exhaust gas emissions and improvement of fuel efficiency, the interference between the EGR control and VNT control becomes a problem that cannot be ignored.

Next, an intake system control device according to a second comparative example will be described.

An intake system control device of the second comparative example uses a VGT having the same configuration as the VNT and makes the EGR control system and VGT control system to cooperate with each other. The second comparison example is an intake system control device that inputs a turbine efficiency calculated from the MAF sensor value and MAP sensor value to the EGR control system and VGT control system. In the second comparative example, the target value and sensor value of MAF are input only to the EGR system, and target value and sensor value of MAP are input only to the VGT control system. Therefore, in the second comparative example, influence of mutual interference between the EGR control and VNT control is not taken into consideration, so that it is difficult to improve engine characteristics at the transition time.

A configuration of the intake system control device 11 will be described.

The intake system control device 11 is implemented as one of logics in an ECU (engine control unit (also referred to as ECM: engine control module)) 8 which is a built-in control system. The engine control unit 8 includes an operation control section 9 for controlling the operation of the diesel engine 1 and the intake system control device 11 for controlling the intake system 10.

The intake system control device 11 determines an intake system output which is a control output from the intake system based on operation conditions and an intake input which is a control input from the intake system. The operation conditions include the rotation speed rpm of the diesel engine 1 and fuel injection amount q to the diesel engine 1. The intake system output includes MAF and MAP. The intake system input includes EGR and VNT. The operation condition may include a throttle opening degree, etc.

Figure 3:
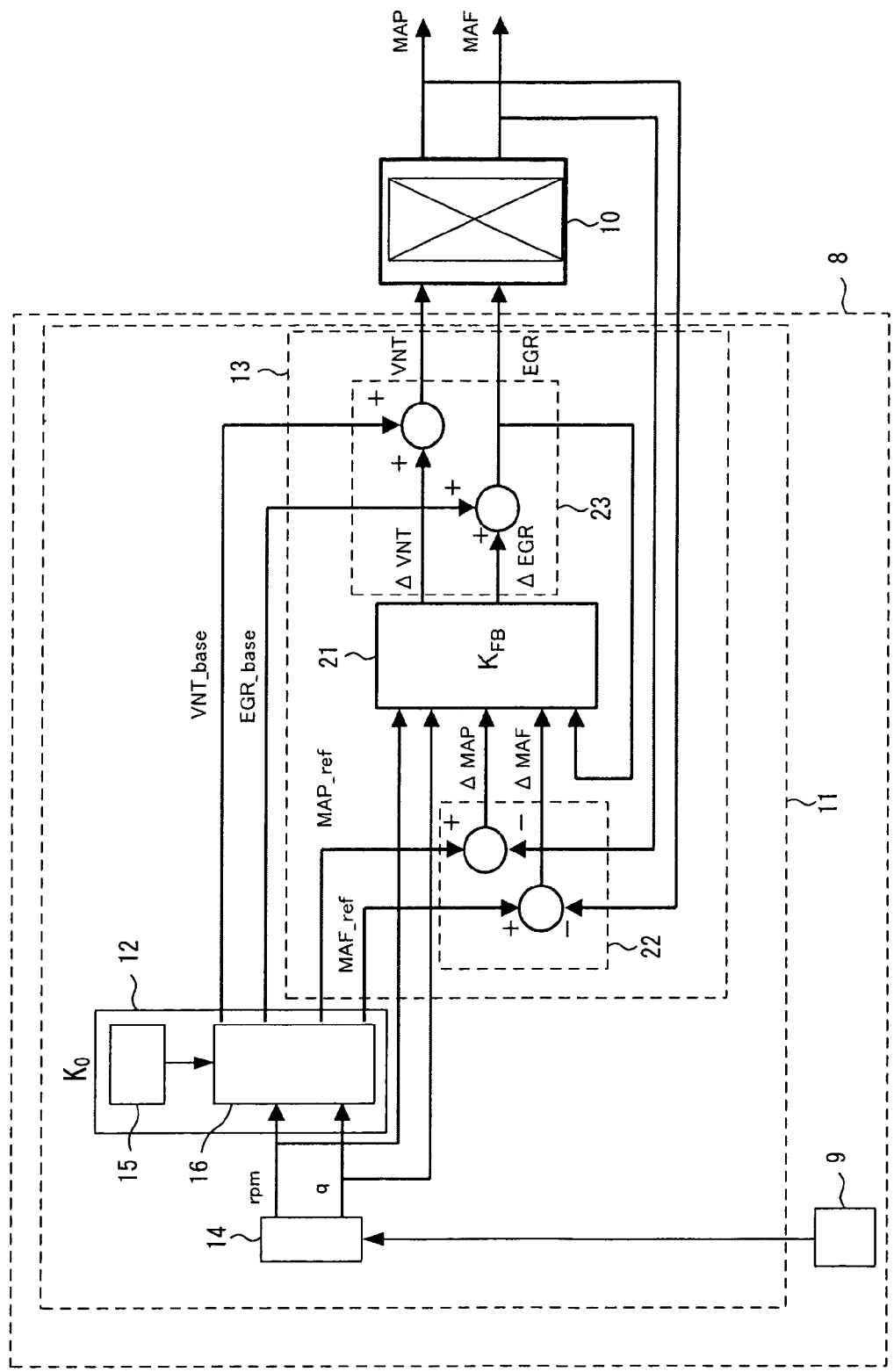
FIG. 3 is a block diagram illustrating a configuration of an intake system control device.

FIG. 3 is a block diagram illustrating a configuration of the intake system control device 11. As illustrated, the intake system control device 11 includes a planner 12 ($k_0$), an input calculation section 13, and an acquisition section 14. The input calculation section 13 includes an FB (feed-back) controller 21 ($K_{FB}$), a subtraction section 22, and an addition section 23.

The FB controller 21 is not a controller that makes the two one-input one-output controls operate simultaneously as in the first and second comparative examples but a controller that operates according to two-input two-output state equation. That is, the FB controller 21 is a controller that considers mutual interference between the EGR control and VNT control.

The FB controller 21 solves the problem in the first comparative example, that is, the problem of reversion of the sign of VNT-MAF gain occurring depending on the magnitude of EGR.

In the logic of the first comparative example, the EGR control system refers only to MAF_ref, and VNT control system refers only to MAP_ref. The logic of the first comparative example determines a control input by combining operation amount (P-element: proportional term) proportional to the error ($\Delta$MAF, $\Delta$MAP) between a target value and current value, operation amount (I-element: integral term) proportional to the total sum of the errors measured from the start time and, as needed, operation amount (D-element: derivative term) proportional to the variation amount of the error. This control operation is called PID control. In the logic of the first comparative example, the proportionality coefficient (gain) of each element can be changed in accordance with the error amount or sign; actually, however, the value thereof is corrected in a trial-and-error manner at experiment site.

The FB controller 21 uses an output variation value obtained through vectorization of a variation ΔMAF of MAF and a variation ΔMAP of MAP to determine an input variation value obtained through vectorization of a variation ΔEGR of EGR and a variation ΔVNT of VNT. The FB controller 21 multiples a gain matrix in the state equation by the output variation value and its integral value to obtain the input variation value.

The planner 12 determines, as output steady-state values which are steady-state values of an intake system output, a target value MAF_ref of MAF and a target value MAP_ref of MAP from the rotation speed rpm and injection amount q. Further, the planner 12 determines, as input steady-state values which are steady-state values of an intake system input, an initial control input EGR_base of EGR and an initial control input VNT_base of VNT from the operation conditions. The input calculation section 13 compares the target values of MAF and MAP with current values thereof and controls the values of EGR and VNT so as to make the target values and current values coincide with each other.

The planner 12 includes a second table storage section 15 and a second correspondence value determination section 16. The second table storage section 15 stores a steady-state value table representing output steady-state values and input steady-state values corresponding to the operation conditions. The output steady-state values and input steady-state values are obtained through an identification experiment to be described later. The second correspondence value determination section 16 acquires the output steady-state value and input steady-state value corresponding to a given operation condition from the steady-state value table and outputs them to the input calculation section 13.

The operation of determining EGR_base and VNT_base by the planner 12 is made under FF (feed-forward) control, and operation of determining the values of EGR and VNT by the input calculation section 13 is made under FB (feed-back) control.

The input calculation section 13 calculates a new intake system output from the operation condition, output steady-state value, input steady-state value, and intake system output.

The subtraction section 22 subtracts the intake system output from the output steady-state value to calculate an output variation value. The FB controller 21 calculates an input variation value from the output variation value, operation condition, and EGR of the intake system input. The addition section 23 adds the input steady-state value and input variation value to calculate the intake system input.

A method of designing a control system of the FB controller 21 will be described.

Figure 4:
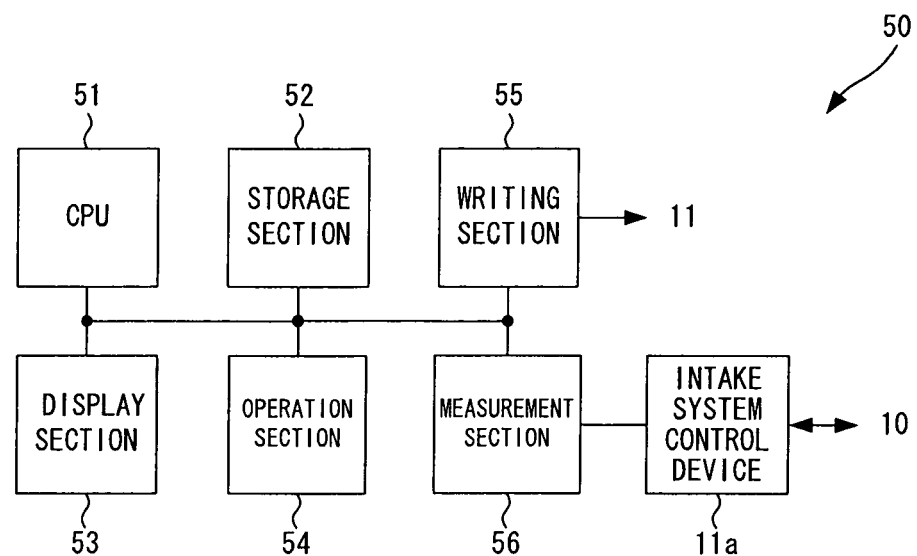
FIG. 4 is a block diagram illustrating a configuration of a control system design device.

A control system design device 50 that executes the design method of a control system of the FB controller 21 is realized by a computer. FIG. 4 is a block diagram illustrating a configuration of the control system design device 50. The control system design device 50 includes a CPU (Central processing Unit) 51, a storage section 52, a display section 53, an operation section 54, a writing section 55, a measurement section 56, and an intake system control device 11a. The storage section 52 stores a formula manipulation program for implementing the control system design method. The CPU 51 executes the formula manipulation program stored in the storage section 52. The writing section 55 writes the steady-state value table determined by the control system design method into the second table storage section 15 in the intake system control device 11 and writes a gain matrix table determined by the control system design method into a first table storage section 41 in the intake system control device 11. The measurement section 56 executes an identification experiment for system identification and measures a result of the identification experiment. The intake system control device 11a controls the intake system 10 in the identification experiment.

The intake system control device 11a has the same configuration of the intake system control device of the first comparative example. That is, the intake system control device 11a independently performs the PID control of EGR for MAF and PID control of VNT for MAP. The target of the output of the intake system control device 11 in a steady state corresponds to an output of the intake system control device 11a having the same configuration of the intake system control device of the first comparative example in a steady state. Thus, in the control system design method, system identification is performed by the identification experiment using the intake system control device 11a. The transition state is a state where a variation amount of EGR and variation amount of VNT in a predetermined elapsed time are larger than a predetermined variation threshold. The steady state is a state where a variation amount of EGR and variation amount of VNT in a predetermined elapsed time are equal to or smaller than the predetermined variation threshold.

In the method of designing the control system of the FB controller 21, the gain matrix (A matrix, B matrix) representing the coefficient of the state equation is not searched for in a trial-and-error manner at experiment site, but is calculated from a result of the system identification.

Figure 5:
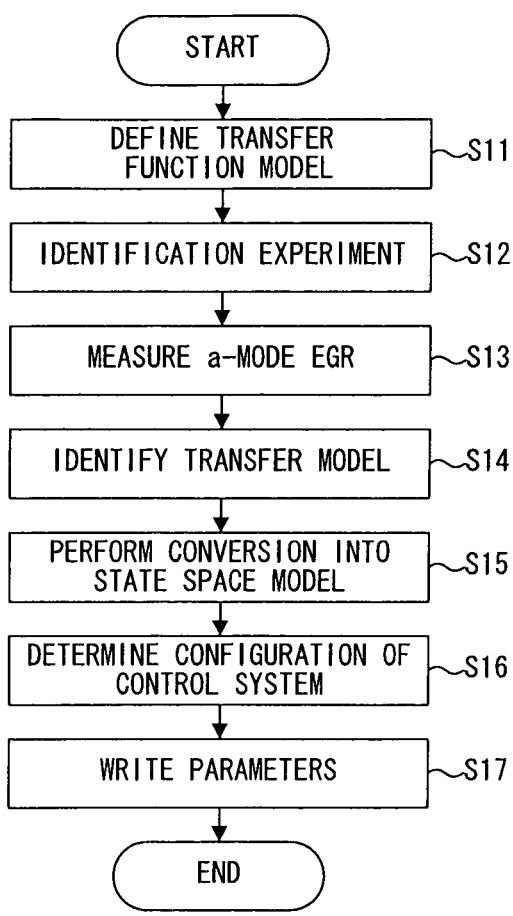
FIG. 5 is a flowchart illustrating a method of designing a control system of an FB controller.

FIG. 5 is a flowchart illustrating the method of designing the control system of the FB controller 21.

Figure 6:
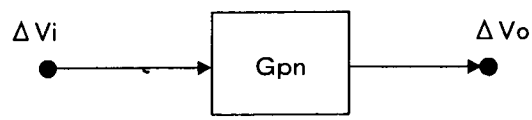
FIG. 6 is a block diagram illustrating a definition of a transfer function model.

The control system design device 50 defines the transfer function model (formula model) of an identification model Gpn to be calculated through the system identification (S11). FIG. 6 is a block diagram illustrating a definition of the transfer function model. Gpn reacts only to a variation amount of an input and is therefore defined as a difference system (relative amount). Gpn inputs ΔVi and outputs ΔVo. ΔVi is a vector having elements of both ΔEGR and ΔVNT, and ΔVo is a vector having elements of both ΔMAF and ΔMAP.

Figure 7:
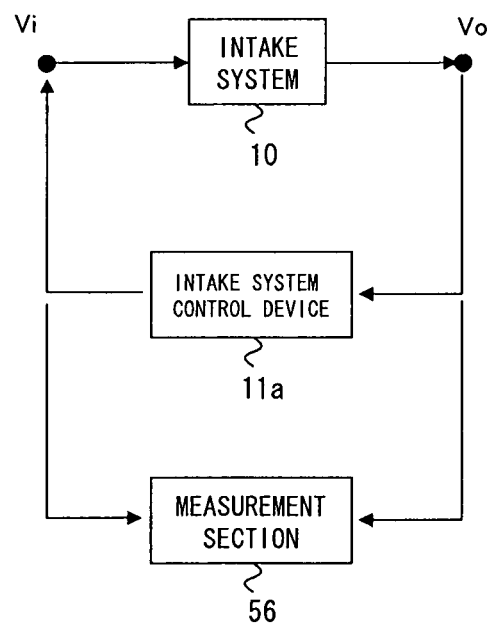
FIG. 7 is a block diagram illustrating an identification experiment.

The control system design device 50 executes the identification experiment and acquires a result of the identification experiment (S12). The intake system 10 inputs EGR and VNT as the intake system input and outputs MAF and MAP as the intake system output. In the identification experiment, a value (absolute value) including the steady state before a change of the intake system input is given as the intake system input, so that Gpn defined as the difference system cannot directly be calculated. Thus, in the identification experiment, a plurality of operation conditions (rotation speed rpm, injection amount q) are defined so as to measure the intake system input Vi and intake system output Vo in the steady state under each operation condition. FIG. 7 is a block diagram illustrating the identification experiment. Vi is a vector having elements of both EGR and VNT, and Vo is an vector having elements of both MAF and MAP.

In the identification experiment, the intake system control device 11a independently performs the PID control of EGR for MAF and PID control of VNT for MAP to thereby control the intake system 10. In the identification experiment, the measurement section 56 defines the input Vi in the steady state under each operation condition as an FF value Vi_base and records the FF value Vi_base. Further, the measurement section 56 defines the output Vo in the steady state under each operation condition as a target value Vo_base and records the target value Vo_base. Vi_base is a vector having elements of both EGR_base and VNT base, and Vo_ref is a vector having elements of both MAF_ref and MAP_ref.

Two modes of a-mode and b-mode are defined concerning EGR. The a-mode is a mode where EGR is in the steady state. The b-mode is a mode where EGR is set to 0 (fully closed). The PID control of EGR and PID control of VNT are performed under a given operation condition (rotation speed, injection amount) to measure the a-mode in the steady state. Further, the PID control of VNT is performed with EGR set to 0 under a given operation condition (rotation speed, injection amount) to measure the b-mode in the steady state.

In the identification experiment, parameters such as gain, time constant, and dead time, of the MAF response and MAP response are calculated in the case where EGR and VNT are changed in a step manner, and the parameters are measured through actual control of the diesel engine 1 by the intake system control device 11a.

The control system design device 50 executes an a-mode identification experiment to acquire an a-mode measurement value and executes a b-mode identification experiment to acquire an b-mode measurement value.

The control system design device 50 measures a-mode EGR (S13). As in the case of the a-mode, the measurement section 56 performs the PID control of EGR and PID control of VNT under a given cooperation condition (rotation speed, injection amount) to measure EGR in the steady state.

Figure 8:
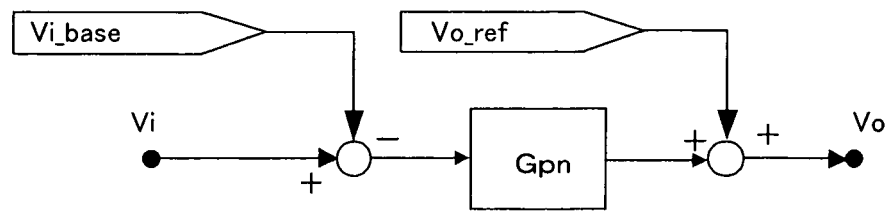
FIG. 8 is a block diagram illustrating an identification method of a transfer function model.

The control system design device 50 performs identification of the transfer function model of Gpn (S14). FIG. 8 is a block diagram illustrating an identification method of the transfer function model. For identification of Gpn, the control system design device 50 sets a value obtained by subtracting the FF value Vi_base from the input Vi of the intake system 10 in the identification experiment as an input ΔVi of the transfer function model of Gpn and sets a value obtained by subtracting the target value Vo_ref from the output Vo of the intake system 10 in the identification experiment as an output ΔVo of the transfer function model of Gpn.

The control system design device 50 identifies an a-mode transfer function model of Gpn from the a-mode measurement value and identifies a b-mode transfer function model of Gpn from the b-mode measurement value.

The control system design device 50 converts the identified transfer function model into a discrete system state space model suitable for numerical calculation (S15). More specifically, the control system design device 50 converts the transfer function model of Gpn into a state space model of Gpn using a formula manipulation tool. The state space model of Gpn is described by the following state equation.

$$\frac{d}{dt}\begin{bmatrix} \Delta MAF \\ \Delta MAP \end{bmatrix} = \begin{bmatrix} A_{11} & A_{12} \\ A_{21} & A_{22} \end{bmatrix}\begin{bmatrix} \Delta MAF \\ \Delta MAP \end{bmatrix} + \begin{bmatrix} B_{11} & B_{12} \\ B_{21} & B_{22} \end{bmatrix}\begin{bmatrix} \Delta EGR \\ \Delta VNT \end{bmatrix} \quad \text{[Numeral 1]}$$

A matrix Ad is a matrix of two rows and two columns and has elements $A_{11}, A_{12}, A_{21}$, and $A_{22}$. A matrix Bd is a matrix of two rows and two columns and has elements $B_{11}, B_{12}, B_{21}$, and $B_{22}$. A vertical vector ΔVo has elements of ΔMAF and ΔMAP. A vertical vector ΔVi has elements of ΔEGR and ΔVNT.

Figure 9:
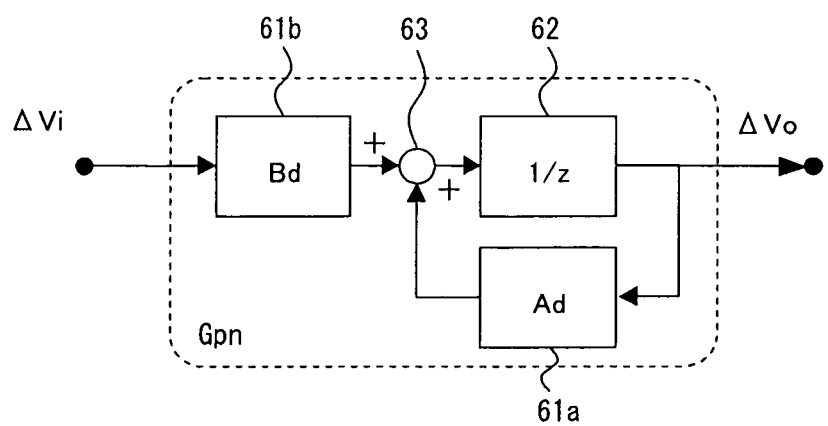
FIG. 9 is a block diagram illustrating a state space model.

FIG. 9 is a block diagram illustrating the state space model. As in the case of the transfer function model, the state space model of Gpn inputs ΔVi and outputs ΔVo. The state space model includes a multiplier 61a for multiplying the gain matrix Ad by ΔVo, a multiplier 61b for multiplying the gain matrix Bd by ΔVi, an adder 63 for adding an output of the multiplier 61a and output of the multiplier 61b, and a delaying device 62 for delaying the output of the adder 63 by one sample. The output of the delaying device 62 is ΔVo.

The control system design device 50 calculates an a-mode state space model from the a-mode transfer function model and calculates a b-mode state space model from the b-mode transfer function model. The control system design device 50 defines Ad identified in the a-mode as Aa, defines Bd identified in the a-mode as Ba, defines Ad identified in the b-mode as Ab, defines Bd identified in the b-mode as Bb, and defines EGR in the steady state measured in the a-mode as ea.

The control system design device 50 determines a configuration of the control system of the FB controller 21 based on the state space model and a predetermined control system construction method (S16). A concrete example of a configuration of the control system will be described later.

The control system design device 50 writes calculated parameters into the intake system control device 11 (S17). More specifically, the writing section 55 writes the FF value Vi_base and target value Vo_ref in each operation condition into the second table storage section 15. Further, the writing section 55 writes the elements Aa, Ba, Ab, and Bb of the matrices representing the state space model in each operation condition and ea into the first table storage section 41.

The control system design device 50 then ends this flow.

A concrete example of a configuration of the FB controller 21 will be described.

When the state space model is obtained, an arbitrary control system construction method can be adopted. A general method is, e.g., an optimal control (method of calculating, as a solution of Riccati equation, a gain matrix that minimizes total sum of displacements and total sum of control inputs with an appropriate weighting). A method suitably adopted in the case where emphasis is put on response characteristics at the transition time is, e.g., an ILQ (inverse linear quadratic) control (an inverse matrix of the B matrix is multiplied by error itself and integration of the error, respectively, and results are added to obtain the control amount, which is also referred to as inverse optimal control). A method suitably adopted in the case where there is a need to cope with a gap between a real machine and model representation is, e.g., a robust control (model is represented by nominal model and variable elements so as to satisfy required response to the worst case including the variation).

Figure 10:
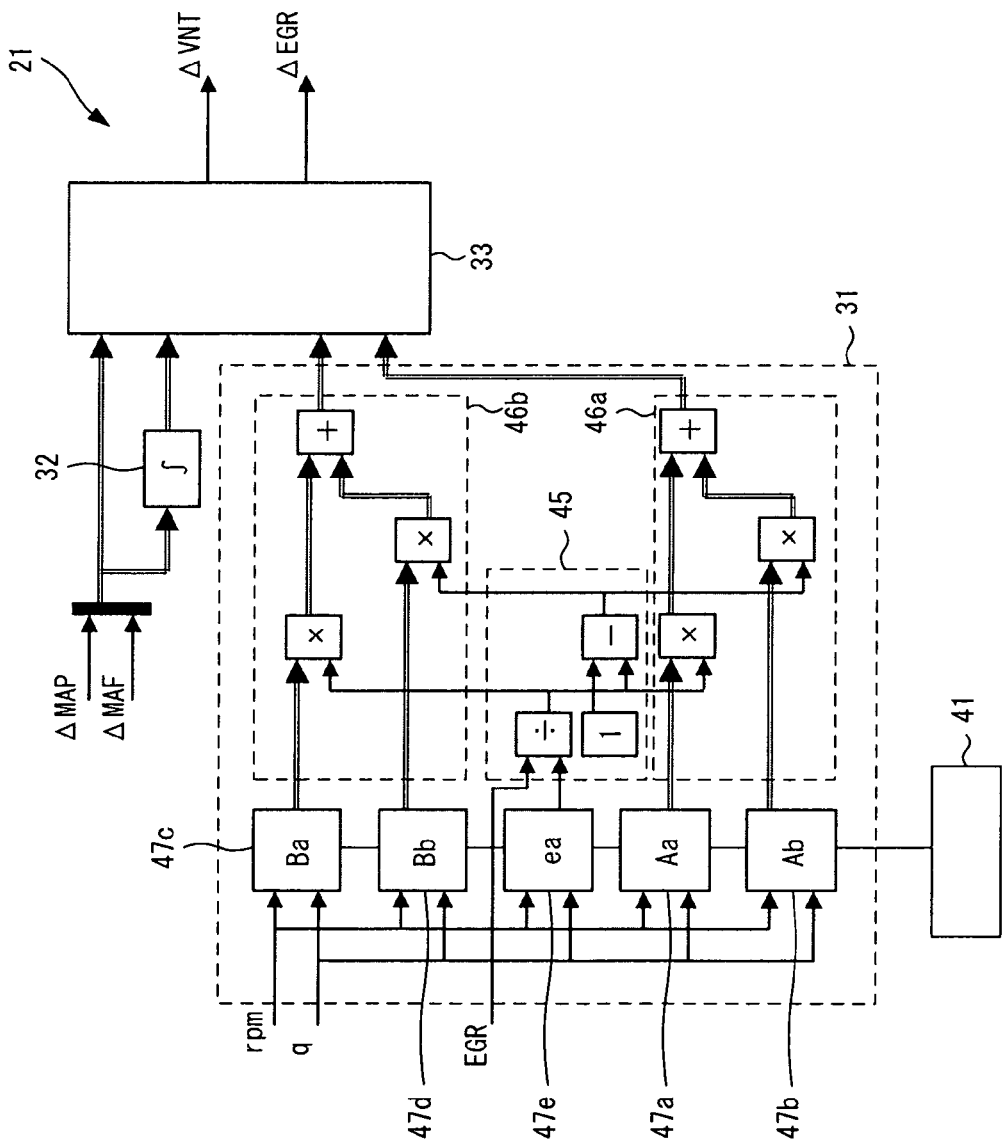
FIG. 10 is a block diagram illustrating a configuration of an FB controller that uses an ILQ control.

In the present embodiment, the ILQ control is used. FIG. 10 is a block diagram illustrating a configuration of the FB controller 21 that uses the ILQ control. The FB controller 21 includes a gain matrix calculation section 31, an integration section 32, a variation value calculation section 33, and a first table storage section 41. The first table storage section 41 stores a gain matrix table representing Aa, Ab, Ba, and Bb corresponding to each of the plurality of operation conditions and an EGR table representing ea corresponding to each of the plurality of operation conditions.

The gain matrix calculation section 31 includes first correspondence value determination sections 47a, 47b, 47c, 47d, and 47e, a distribution ratio calculation section 45, an interpolation sections 46a and 46b. The first correspondence value determination sections 47a, 47b, 47c, 47d, and 47e each acquire Aa, Ab, Ba, Bb, and ea corresponding to the acquired operation condition from the first table storage section 41.

The gain matrix calculation section 31 will be described below.

The system identification in many intake control system is generally performed for each operation condition (rotation speed rpm, injection amount q). However, as described above, the characteristics of the intake system 10 change depending on EGR. Thus, as described above, in the method of designing the control system of the FB controller 21 measures EGR in the steady state under each of the plurality of operation conditions.

With the above operation, Ad and Bd which are gain matrices of the state space model of the FB controller 21 each become a matrix that depends on three parameters of rpq, q, and ea. This model is called a three-dimensional model. That is, in the definition of the three-dimensional model, there are three elements that can change the numerical values in the matrix. The gain matrices Ad and Bd each has a size of two-rows and two columns (in the case of two inputs and two outputs). For generation of the three-dimensional model, Aa, Ab, Ba, and Bb are identified through the abovementioned a-mode and b-mode identification experiments.

Figure 11:
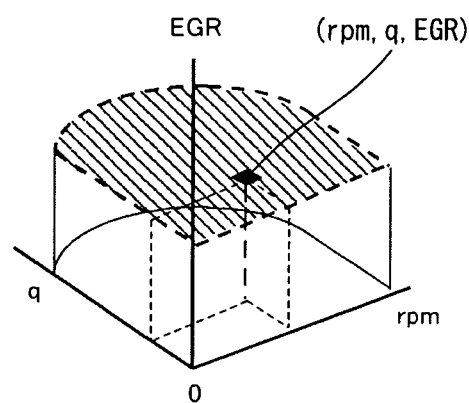
FIG. 11 is a view illustrating a range of (rpm, q, EGR) in a comparative example.

FIG. 11 is a view illustrating a range of (rpm, q, EGR) in the first comparative example. EGR in the first comparative example is fixed to ea in the steady state corresponding to (rpm, q). Thus, a coefficient table in the first comparative example determines a coefficient of the state equation for an arbitrary operation condition (rpm, q). A point (rpm, q, EGR) determined in the first comparative example can have any value on the shaded curved surface in FIG. 11.

Figure 12:
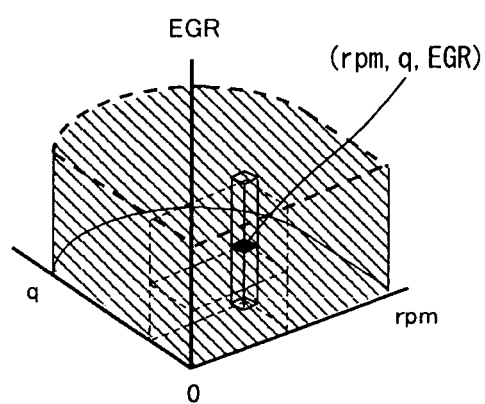
FIG. 12 is a view illustrating a range of (rpm, q, EGR) in the FB controller.

On the other hand, the FB controller 21 stores the gain matrix table representing Aa, Ab, Ba, and Bb corresponding to (rpm, q) and EGR table representing ea corresponding to (rpm, q). FIG. 12 is a view illustrating a range of (rpm, q, EGR) in the FB controller 21. The FB controller 21 refers to the EGR table to determine ea according to an arbitrary operation condition (rpm, q). Further, the FB controller 21 refers to the gain matrix table to determine the gain matrices Ad and Bd in (rpm, q, EGR). EGR can have an arbitrary value between 0 and ea. That is, a point (rpm, q, EGR) determined by the FB controller 21 can have any value in the shaded three-dimensional space in FIG. 12.

The gain matrix calculation section 31 performs linear distribution (interpolation) of the elements Aa and Ab in accordance with ea corresponding to the operation condition to calculate Ad. Similarly, the FB controller 21 performs linear distribution (interpolation) of the elements Ba and Bb in accordance with EGR to calculate Bd.

In the case where EGR is equal to or larger than EGR in the steady state (a-mode) under the current operation condition, the FB controller 21 does not perform extrapolation in order to prevent generation of an unintended system matrix but outputs a-mode matrix values Aa and Ba without modification.

Next, operation of the intake system control device 11 will be described.

Figure 13:
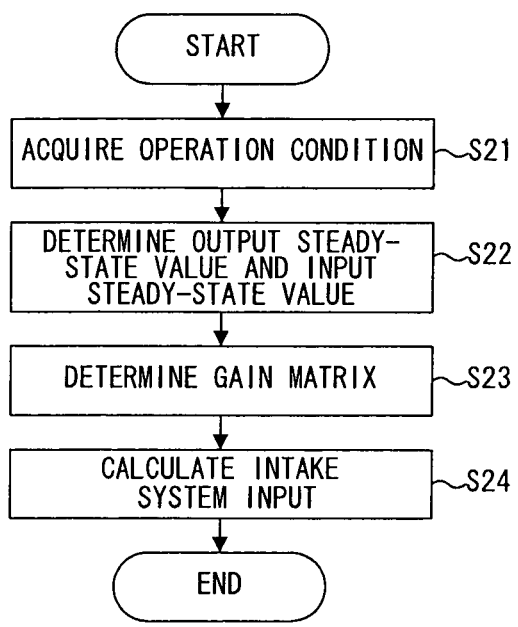
FIG. 13 is a flowchart illustrating operation of the intake system control device.

FIG. 13 is a flowchart illustrating operation of the intake system control device 11.

The acquisition section 14 acquires an operation condition from the operation control section 9 (S21). The planner 12 determines an output steady-state value which is an intake system input obtained under the current operation condition and in the steady state and an input steady-state value which is an intake system input obtained under the current operation condition and in the steady state (S22). The gain matrix calculation section 31 determines ea corresponding to the current operation condition, determines gain matrix Ad from Aa, Ab, and ea corresponding to the current operation condition and current EGR, and determines gain matrix Bd from Ba, Bb, and ea corresponding to the current operation condition and current EGR (S23). The integration section 32 and variation value calculation section 33 uses a state space model defined by the determined gain matrices Ad and Bd to calculate an intake system input Vi from the current operation condition, determined input steady-state value, determined steady-state output value, and current intake system output Vo (S24).

The intake system control device 11 repeats the above processing flow.

Next, the variation value calculation section 33 will be described.

In the case where the variation value calculation section 33 has the inverse matrix generation section 70 for calculating the inverse matrix of Bd as in the case where the ILQ control is adopted as the control system construction method of the FB controller 21, it is estimated that the vector constituting Bd loses its linear independence and the value of the determinant Bd becomes 0. Further, there may be case where the absolute value of the determinant becomes significantly small depending on the operation condition or unit system, even if the value of the determinant does not become 0.

Figure 14:
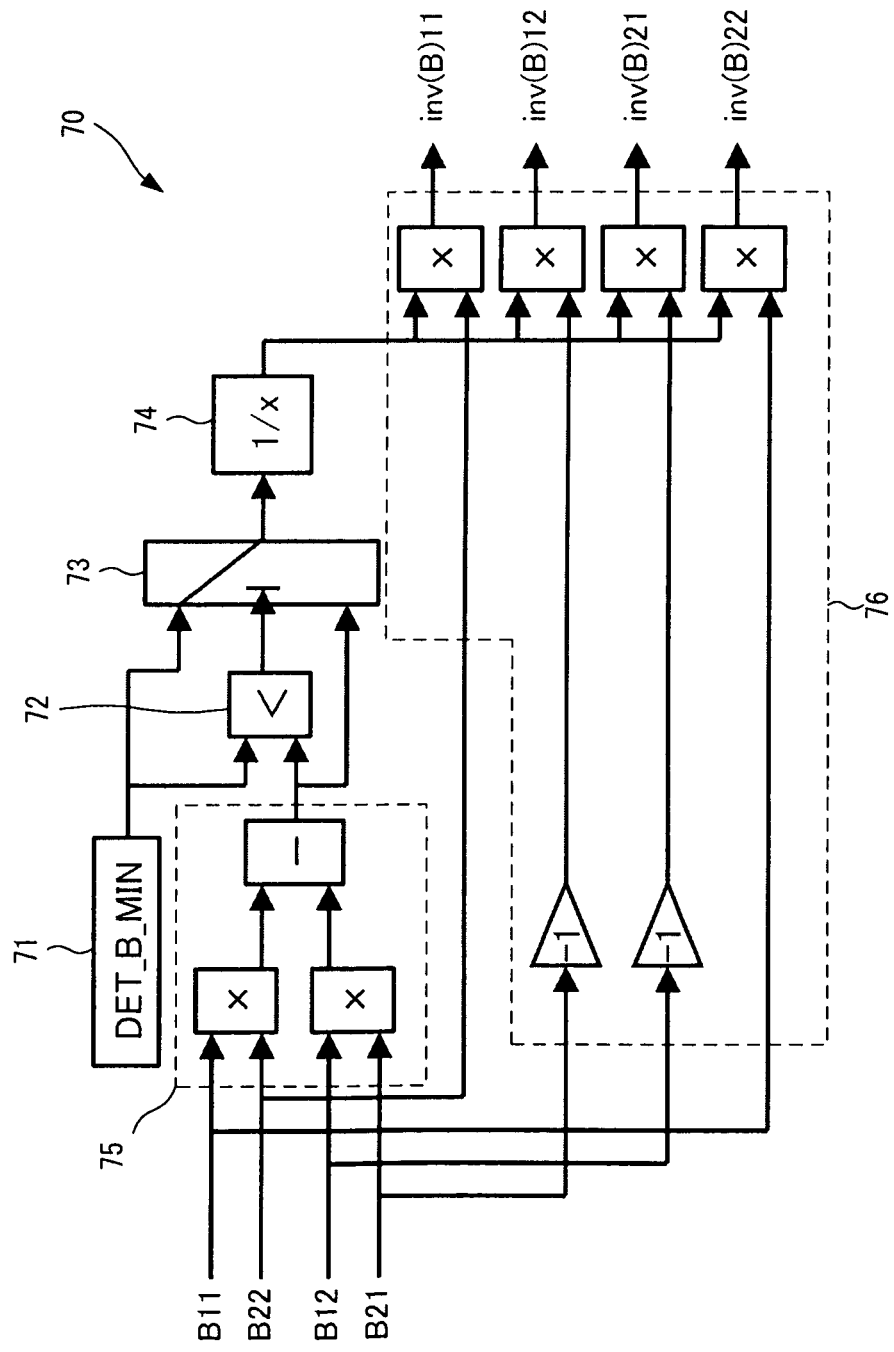
FIG. 14 is a block diagram illustrating a configuration of an inverse matrix generation section.

The inverse matrix generation section 70 prevents generation of an excessive control input caused by the above cases. FIG. 14 is a block diagram of the inverse matrix generation section 70. The inverse matrix generation section 70 includes a minimum value storage section 71, a comparator 72, a switch 73, an inverse number calculation section 74, a determinant calculation section 75, and an element calculation section 76. The elements B11, B12, B21, and B22 of Bd are input to the inverse matrix generation section 70. Elements inv(B) 11, inv(B)12, inv(B) 21, and inv(B) 22 of the inverse matrix of Bd are output from the inverse matrix generation section 70.

The minimum value storage section 71 stores a minimum value DET_B_MIN of the determinant of Bd. The determinant calculation section 75 calculates the determinant of Bd. When the comparator 72 determines that the value of the determinant of Bd is equal to or less than DET_B_MIN, the switch 73 outputs DET_B_MIN for zero avoidance. The FB controller 21 preferably performs such zero avoidance.

The inverse number calculation section 74 calculates the inverse number of the output from the switch 73. The element calculation section 76 calculates elements of the inverse matrix of Bd based on the elements of Bd and output from the inverse number calculation section 74.

Effects of the intake system control device 11 will be described.

The intake system control device 11 performs modeling including EGR to thereby suppress occurrence of inverse response due to a change of the sign of an increment of MAF by EGR at the time of an increase in VNT.

According to the intake system control device 11, a reduction of occurrence of the inverse response at the transition operation time at which EGR is suddenly changed can be expected. Further, a reduction of exhaust gas emission (NOx/PM) can be expected.

Another configuration of the intake system control device 11 will be described.

The usage of the three-dimensional model is not limited to the aforementioned configuration of the FB controller 21. Even in the FB controller 21 employing another control system construction method, the gain matrix calculation section 31 performs linear distribution of Aa and Ab which are identification models in accordance with ea corresponding to the acquired operation condition to calculate Ad and performs linear distribution of Ba and Bb which are identification models in accordance with ea corresponding to the acquired operation condition to calculate Bd.

The intake system control device of the invention may be applied to control of the intake system of engines other than the diesel engine. For example, the intake system control device of the invention may be applied to a gasoline engine having an in-cylinder direct injection section, an exhaust gas recirculation section, and a supercharging section.

An acquisition section 14 corresponds to, e.g., the acquisition section 14.

A steady-state value determination section corresponds to, e.g., the planner 12.

A gain determination section corresponds to, e.g., the gain matrix calculation section 31.

A first input calculation section includes the subtraction section 22, integration section 32, variation value calculation section 33, and addition section 23.

A first relationship storage section corresponds to, e.g., the first table storage section 41.

A second relationship storage section corresponds to, e.g., the second table storage section 15.

A first correspondence value determination section corresponds to, e.g., the first correspondence value determination sections 47a, 47b, 47c, 47d, and 47e.

A second correspondence value determination section corresponds to, e.g., the second correspondence value determination section 16.

An output variation value calculation section corresponds to, e.g., the subtraction section 22.

An input variation value calculation section includes, e.g., the integration section 32 and variation value calculation section 33.

A second input calculation section corresponds to, e.g., the addition section 23.

A first output gain corresponds to, e.g., Aa.
A second output gain corresponds to, e.g., Ab.
A determined input gain corresponds to, e.g., Ad.
A first input gain corresponds to, e.g., Ba.
A second input gain corresponds to, e.g., Bb.
A determined input gain corresponds to, e.g., Bd.
A specific valve opening degree corresponds to, e.g., ea.

A first range corresponds to, e.g., a state where EGR is equal to or larger than a predetermined EGR threshold.

A second range corresponds to, e.g., a state where EGR is smaller than the predetermined EGR threshold.

| | |
|---|---|
| 1 | is a diesel engine. |
| 2 | is a VNT. |
| 3 | is an intake pressure sensor. |
| 4 | is a fresh air flow sensor. |
| 5 | is an EGR section. |
| 6 | is exhaust gas. |
| 7 | is fresh air. |
| 8 | is an engine control unit. |
| 9 | is an operation control section. |
| 10 | is an intake system. |
| 11 | is an intake system control device. |
| 11a | is an intake system control device. |
| 12 | is an planner. |
| 13 | is an input calculation section. |
| 14 | is an acquisition section. |
| 15 | is a second table storage section. |
| 16 | is a second correspondence value determination section. |
| 21 | is an FB controller. |
| 22 | is a subtraction section. |
| 23 | is an addition section. |
| 31 | is a gain matrix calculation section. |
| 32 | is an integration section. |
| 33 | is a variation value calculation section. |
| 41 | is a first table storage section. |
| 45 | is a distribution ratio calculation section. |
| 46a and 46b | are interpolation sections. |
| 47a, 47b, 47c, 47d, and 47e | are first correspondence value determination sections.50 is a control system design device. |
| 51 | is a CPU. |
| 52 | is a storage section. |
| 53 | is a display section. |
| 54 | is an operation section. |
| 55 | is a writing section. |
| 56 | is a measurement section. |
| 61a and 61b | are multipliers. |
| 62 | is a delaying device. |
| 63 | is an adder. |

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a depicting of the superiority and inferiority of the invention. Although the embodiment of the present inventions have been described in detail, it should be understood that the various changes, substitutions, and alterations could be made hereto without departing from the spirit and scope of the invention.

What is claimed is:

1. An intake system control device comprising:
   an acquisition section that acquires an operation condition of an engine;
   a steady-state value determination section that determines an input and output steady-state values for an intake system of the engine based on the acquired operation condition, the intake system being a system that includes an exhaust gas recirculation section, a variable nozzle turbocharger, a fresh air flow sensor, and an intake pressure sensor, receives as an input an intake system input including a valve opening degree in the exhaust gas recirculation section and a variable vane opening degree in the variable nozzle turbocharger, and outputs an intake system output including a fresh air flow rate measured by the fresh air flow sensor and an intake pressure measured by the intake pressure sensor, the input steady-state value being the intake system input obtained under the acquired operation condition and in the steady state, the output steady-state value being the intake system output obtained under the acquired operation condition and in the steady state;
   a gain determination section that determines a gain for a state space model, the state space model being a model that is used for control of the intake system, receives as a model input a variation of the valve opening degree and a variation of the variable vane opening degree, and outputs as a model output a variation of the fresh air flow rate and a variation of the intake pressure, the gain determination section determining the determined gain from the acquired operation condition and the valve opening degree based on a first relationship among the operation condition, valve opening degree, and a gain in the state space model; and
   a first input calculation section that calculates the intake system input from the acquired operation condition, the input steady-state value, the output steady-state value, and the intake system output by using the state space model having the determined gain.

2. The intake system control device according to claim 1, wherein
   the gain includes an output gain by which the model output is to be multiplied and an input gain by which the model input is to be multiplied, and
   the gain determination section comprises:
   a first relationship storage section that stores the first relationship among the operation condition, a specific valve opening degree in a first state, a first output gain which is an output gain in the first state, a first input gain which is an input gain in the first state, a second output gain which is an output gain in a second state where the valve opening degree is lower than that in the first state, and a second input gain which is an input gain in the second state;
   a first correspondence value determination section that determines, based on the first relationship, a specific valve opening degree corresponding to the acquired operation condition, a first output gain corresponding to the acquired operation condition, a second output gain corresponding to the acquired operation condition, a first input gain corresponding to the acquired operation condition, and a second input gain corresponding to the acquired operation condition;

an output gain determination section that determines the output gain based on the valve opening degree, the determined specific valve opening degree, the determined first output gain, and the determined second output gain; and an input gain determination section that determines the input gain based on the valve opening degree, the determined specific valve opening degree, the determined first input gain, and the determined second input gain.

3. The intake system control device according to claim 2, wherein the operation condition includes a first operation condition amount and a second operation condition amount, and each of the output gain and the input gain is a matrix of two rows and two columns.

4. The intake system control device according to claim 3, wherein the first operation condition amount is a rotation speed of the engine, and the second operation condition amount is a fuel injection amount to the engine.

5. The intake system control device according to claim 2, wherein the first state is the steady state of the valve opening degree and the variable vane opening degree in the case where control of the valve opening degree for the fresh air flow rate and control of the variable vane opening degree for the intake pressure are performed independently of each other, and the second state is the steady state of the variable vane opening degree in the case where the control of the variable vane opening degree for the intake pressure is performed with the valve opening degree fixed to a minimum value.

6. The intake system control device according to claim 5, wherein the first relationship storage section stores a plurality of the operation conditions, a specific valve opening degree corresponding to each of the plurality of the operation conditions, a first output gain corresponding to each of the plurality of the operation conditions, a second output gain corresponding to each of the plurality of the operation conditions, a first input gain corresponding to each of the plurality of the operation conditions, and a second input gain corresponding to each of the plurality of the operation conditions, the output gain determination section acquires the determined specific valve opening degree, the determined first output gain, and the determined second output gain from the storage section and interpolates the determined first output gain and the determined second output gain in accordance with the valve opening degree and the determined specific valve opening degree to calculate the output gain, and the input gain determination section acquires the determined specific valve opening degree, the determined first input gain, and the determined second input gain from the storage section and interpolates the determined first input gain and the determined second input gain in accordance with the valve opening degree and the determined specific valve opening degree to calculate the input gain.

7. The intake system control device according to claim 6, wherein the output gain determination section calculates the output gain by linearly interpolating the determined first output gain and the determined second output gain in accordance with a ratio between the valve opening degree and the determined specific valve opening degree, and the input gain determination section calculates the input gain by linearly interpolating the determined first input gain and the determined second input gain in accordance with a ratio between the valve opening degree and the determined specific valve opening degree.

8. The intake system control device according to claim 1, wherein the steady-state value determination section comprises:

a second relationship storage section that stores a second relationship among the operation condition, an output steady-state value, and an input steady-state value; and a second correspondence value determination section that determines, based on the first relationship, the output steady-state value corresponding to the acquired operation condition and the input steady-state value corresponding to the acquired operation condition.

9. The intake system control device according to claim 1, wherein the first input calculation section comprises:

an output variation value calculation section that calculates an output variation value which is a variation of the intake system output based on the output steady-state value and the intake system output;

an input variation value calculation section that calculates an input variation value which is a variation of an intake system input from the output variation value, the intake system output, and the acquired operation condition based on the state space model including the determined gain; and a second input calculation section that calculates an intake system input based on the input steady-state value and the input variation value.

10. The intake system control device according to claim 9, wherein the output variation value calculation section subtracts the intake system output from the output steady-state value to calculate the output variation value, and the second input calculation section adds the input steady-state value and the input variation value to calculate the intake system input.

11. The intake system control device according to claim 9, wherein the input variation value calculation section performs one of an optimal control, an ILQ control, and a robust control based on the state space model.

12. The intake system control device according to claim 2, wherein in the first state, a variation amount of the valve opening degree relative to a predetermined variation amount of the variable vane opening degree within a first range and a variation of the valve opening degree relative to the predetermined variation amount of the variable vane opening degree within a second range lower than the first range have different signs.

13. An intake system control method comprising:

acquiring an operation condition of an engine;

determining an input and output steady-state values for an intake system of the engine based on the acquired operation condition, the intake system being a system that includes an exhaust gas recirculation section, a variable nozzle turbocharger, a fresh air flow sensor, and an intake pressure sensor, receives as an input an intake system input including a valve opening degree in the exhaust gas recirculation section and a variable vane opening degree in the variable nozzle turbocharger, and outputs an intake system output including a fresh air flow rate measured by the fresh air flow sensor and an intake pressure measured by the intake pressure sensor, the input steady-state value being the intake system input obtained under the acquired operation condition and in the steady state, and the output steady-state value being the intake system output obtained under the acquired operation condition and in the steady state;

determining a gain for a state space model, the state space model being a model that is used for control of the intake system, receives as a model input a variation of the valve opening degree and a variation of the variable vane opening degree, and outputs as a model output a variation of the fresh air flow rate and a variation of the intake pressure, the determined gain from the acquired operation condition and valve opening degree based on a first relationship among the operation condition, the valve opening degree, and a gain in the state space model; and calculating the intake system input from the acquired operation condition, the input steady-state value, the output steady-state value, and the intake system output by using the state space model having the determined gain.

14. The intake system control method according to claim 13, wherein the gain includes an output gain by which the model output is to be multiplied and an input gain by which the model input is to be multiplied, the intake system control method further comprises storing, in a first relationship storage section, the first relationship among the operation condition, a specific valve opening degree in a first state, a first output gain which is an output gain in the first state, a first input gain which is an input gain in the first state, a second output gain which is an output gain in a second state where the valve opening degree is lower than that in the first state, and a second input gain which is an input gain in the second state, and the determining of the gain comprises:

determining, based on the first relationship, a specific valve opening degree corresponding to the acquired operation condition, a first output gain corresponding to the acquired operation condition, a second output gain corresponding to the acquired operation condition, a first input gain corresponding to the acquired operation condition, and a second input gain corresponding to the acquired operation condition;

determining the output gain based on the valve opening degree, the determined specific valve opening degree, the determined first output gain, and the determined second output gain; and determining the input gain based on the valve opening degree, the determined specific valve opening degree, the determined first input gain, and the determined second input gain.

15. The intake system control method according to claim 14, wherein the operation condition includes a first operation condition amount and a second operation condition amount, and each of the output gain and the input gain is a matrix of two rows and two columns.

16. The intake system control method according to claim 14, wherein the first state is the steady state of the valve opening degree and the variable vane opening degree in the case where control of the valve opening degree for the fresh air flow rate and control of the variable vane opening degree for the intake pressure are performed independently of each other, and the second state is the steady state of the variable vane opening degree in the case where the control of the variable vane opening degree for the intake pressure is performed with the valve opening degree fixed to a minimum value.

\* \* \* \* \*

UNITED STATES PATENT AND TRADEMARK OFFICE
CERTIFICATE OF CORRECTION

PATENT NO. : 8,437,946 B2
APPLICATION NO. : 12/805369
DATED : May 7, 2013
INVENTOR(S) : Jun Sasaki et al.

Page 1 of 1

It is certified that error appears in the above-identified patent and that said Letters Patent is hereby corrected as shown below:

Title Page, Item [57] (Abstract), Line 1, Delete "an" and insert -- An --, therefor.

Signed and Sealed this
Eighth Day of October, 2013

Teresa Stanek Rea
*Deputy Director of the United States Patent and Trademark Office*